(12) United States Patent
Li

(10) Patent No.: US 6,930,751 B2
(45) Date of Patent: Aug. 16, 2005

(54) METHOD AND APPARATUS FOR REDUCING FALSE HOOK DETECTION

(75) Inventor: Jin Li, Austin, TX (US)

(73) Assignee: Legerity, Inc., Austin, TX (US)

( * ) Notice: Subject to any disclaimer, the term of this patent is extended or adjusted under 35 U.S.C. 154(b) by 675 days.

(21) Appl. No.: 09/758,893

(22) Filed: Jan. 11, 2001

(65) Prior Publication Data

US 2004/0202310 A1 Oct. 14, 2004

(51) Int. Cl.[7] .......................................... H04M 19/02
(52) U.S. Cl. ........................ 349/413.01; 379/252
(58) Field of Search .............................. 379/382, 399, 379/473, 473.07, 377, 375.09, 373.07, 93.05, 478, 413.01

(56) References Cited

U.S. PATENT DOCUMENTS

| | | | |
|---|---|---|---|
| 4,511,763 A | * | 4/1985 | Skidanenko et al. ........ 379/413 |
| 4,837,818 A | * | 6/1989 | Pieters et al. ............... 379/252 |
| 5,426,695 A | * | 6/1995 | Misu ........................... 379/252 |
| 5,671,272 A | * | 9/1997 | Cotreau ....................... 379/382 |
| 6,078,593 A | * | 6/2000 | Eames et al. ............... 370/498 |
| 6,301,358 B1 | * | 10/2001 | Chen et al. .................. 379/413 |

* cited by examiner

*Primary Examiner*—Xu Mei
*Assistant Examiner*—Walter F. Briney, III
(74) *Attorney, Agent, or Firm*—Williams Morgan & Amerson, P.C.

(57) ABSTRACT

A method and apparatus is provided reducing false switch hook detection in a line card coupled to a subscriber loop. The method comprises operating in a first state of the line card, receiving a control signal, and disabling switch hook detection in the line card. The method further comprises determining an initial condition of a second state of the line card, operating in the second state of the line card in response to receiving the control signal, wherein the second state begins to operate from the determined initial condition. The switch hook detection in the line card is activated.

32 Claims, 10 Drawing Sheets

METHOD AND APPARATUS FOR REDUCING FALSE HOOK DETECTION

BACKGROUND OF THE INVENTION

1. Field of the Invention

This invention relates generally to telecommunications, and, more particularly, to a method and apparatus for reducing false hook detection in a line card.

2. Description of the Related Art

In communications systems, particularly telephony, it is a common practice to transmit signals between a subscriber station and a central switching office via a two-wire bi-directional communication channel. A line card generally connects the subscriber station to the central switching office through a subscriber line. At the subscriber end, a telephonic device may be employed to establish communication with a remote user using the subscriber line. The combination of the telephonic device and the subscriber line is commonly referred to as a subscriber loop.

A line card generally includes at least one subscriber line interface circuit (SLIC) as well as a subscriber line audio-processing circuit (SLAC). The SLIC interfaces with the subscriber loop, and the SLAC interfaces with the SLIC. The SLIC and the SLAC carry out the well-known BORSCHT (Battery feed, Overvoltage protection, Ringing, Supervision, Coding, Hybrid, and Test) functions.

The SLIC of the line card may operate in a variety of states, such as a standby state, active state, and ringing state. Each state may have its own current resolution mode. For example, the standby state may be a high-resolution current mode, while the ringing state may be a low-resolution mode. Switching between the three states may give rise to undesirable transients, partly because of the varying level of currents in the different modes. As a result, the undesirable transients may adversely affect the operation of the SLIC, resulting in false hook detection, for example.

The present invention is directed to overcoming, or at least reducing the effects of, one or more of the problems set forth above.

SUMMARY OF THE INVENTION

In one aspect of the present invention, a method is provided for reducing false switch hook detection in a line card coupled to a subscriber loop. The method comprises operating in a first state of the line card, receiving a control signal, and disabling switch hook detection in the line card. The method further comprises determining an initial condition of a second state of the line card, operating in the second state of the line card in response to receiving the control signal, wherein the second state begins to operate from the determined initial condition. The switch hook detection in the line card is activated.

In another aspect of the present invention, an apparatus is provided to reduce false switch hook detection. The apparatus, which is capable of operating in at least a first and a second state, comprises switch hook detection logic. The apparatus further comprises logic adapted to receive a control signal and determine an initial condition of the second operating state. The logic is further adapted to operate in the second state of the line card in response to receiving the control signal, wherein the second state begins to operate from the determined initial condition. The logic is adapted to activate the switch hook detection logic.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
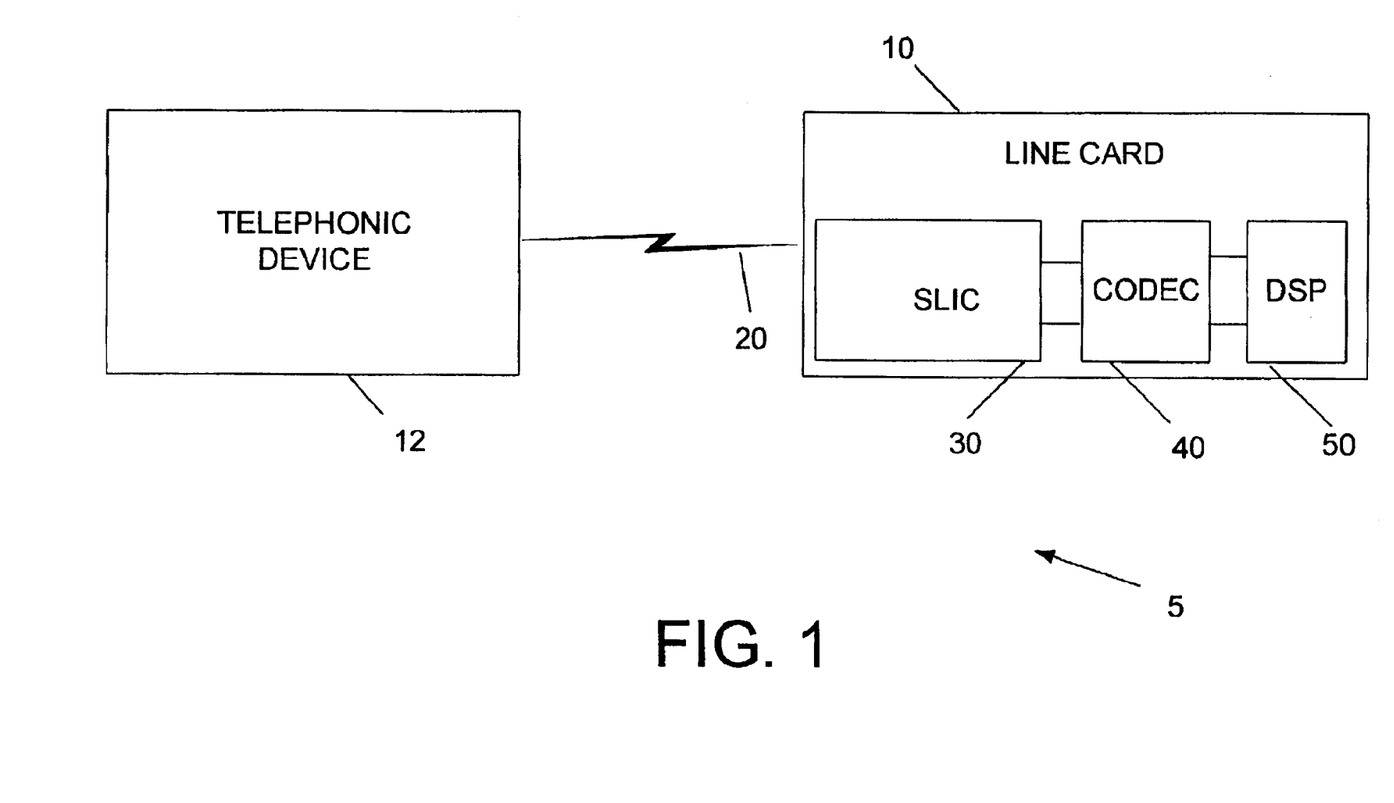
FIG. 1 illustrates a communications system in accordance with the present invention.

Referring first to FIG. 1, a simplified block diagram of a communications system 5 in accordance with the present invention is provided. The communications system 5 includes a line card 10 that interfaces with a telephonic device 12 over a subscriber line 20. In an actual implementation, the line card 110 interfaces with a plurality of subscriber lines 20, but for clarity and ease of illustration, only one is shown. In accordance with the present invention, the line card 10 is capable of providing a reliable method of ring-trip detection and AC fault detection based on a received ringing signal and fault-detection signal, respectively. Additionally, the line card 10 may perform other functions reliably, particularly functions that rely on power calculation.

A subscriber line interface circuit (SLIC) 30 is coupled to the subscriber line 20. Hereinafter, signals received by the line card 10 over the subscriber line 20 are referred to as upstream signals, and signals transmitted by the line card 10 on the subscriber line 20 are referred to as downstream signals. The SLIC 30 supplies an analog upstream signal to a coder/decoder (CODEC) 40. The CODEC 40 receives the analog upstream signal from the SLIC 30 and generates a digital upstream signal that is subsequently passed to a digital signal processor 50. The DSP 50 also provides a digital signal for eventual transmission on the subscriber line 20. The CODEC 40 receives the digital signal, converts it to an analog signal, and provides the analog signal to the SLIC 30, which sends the analog signal over the subscriber line 20.

In the illustrated embodiment, the line card 10, in addition to supporting plain old telephone service (POTS), is adapted to implement an asynchronous digital subscriber line (ADSL) modem for high bandwidth data transfer. The ADSL protocol is described in ANSI T1.413 Issue 2, entitled, "Interface Between Networks and Customer Installation—Asymmetric Digital Subscriber Line (ADSL) Metallic Interface." The SLIC 30 of the line card 10 is capable of performing a variety of functions, such as battery feed, overload protection, polarity reversal, on-hook transmission, and current limiting. Only relevant portions of the SLIC 30, CODEC 40, and DSP 50 are described herein, although those of ordinary skill in the art will appreciate that these devices may perform other functions that are not described in this disclosure.

The telephonic device 12 may comprise a telephone or any other device capable of providing a communication link between at least two users. In one embodiment, the telephonic device 12 may be one of a variety of available conventional telephones, such as wired telephones and similar devices. In an alternative embodiment, the telephonic device 12 may be any device capable of performing a substantially equivalent function of a conventional telephone, which may include, but is not limited to, transmitting and/or receiving voice and data signals. Examples of the telephonic device 12 include a data processing system (DPS) utilizing a modem to perform telephony, a television phone, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through DPS speakers. The calls travel over the Internet as packets of data on shared lines, avoiding the tolls of the PSTN.

Figure 2:
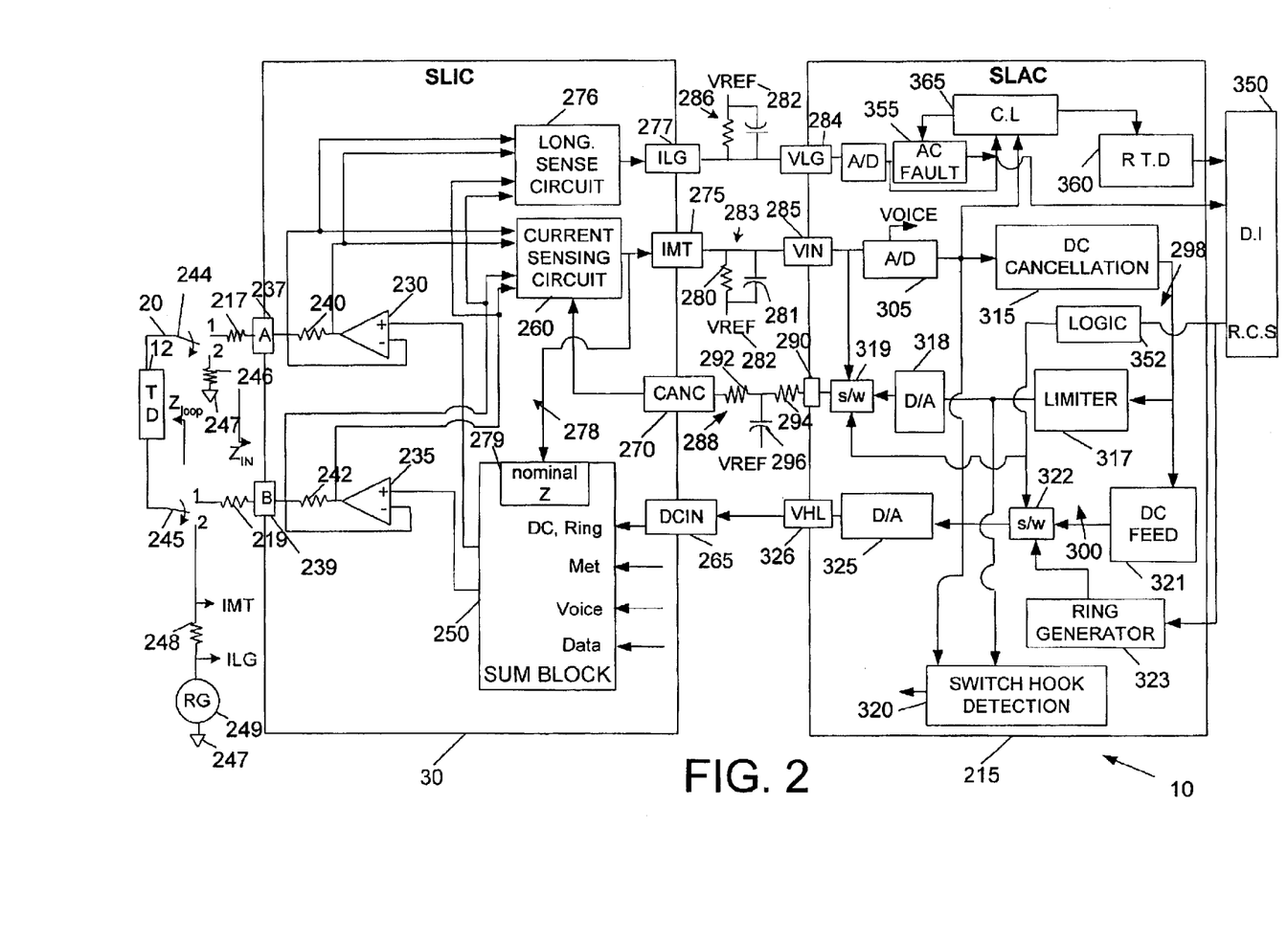
FIG. 2 depicts a block diagram of an embodiment of a line card in accordance with the present invention that can be implemented in the communications system of FIG. 1.

FIG. 2 illustrates one embodiment of the line card 100 in accordance with the present invention. Specifically, the line card 10 includes the SLIC 30, which, in the illustrated embodiment, is a voltage-feed SLIC. The line card 10 also includes the CODEC/DSP 40, 50, which in the illustrated embodiment are shown as a subscriber line audio-process circuit (SLAC) 215 that integrates the functions of both the CODEC and DSP 40, 50. The line card 10 may be located at a central office or a remote location somewhere between the central office and the telephonic device 12 (see FIG. 1). The line card 10 interfaces with the telephonic device 12 through tip and ring terminals 237, 239 at the SLIC 30. The combination of the telephone device 12 and the subscriber line 20 is generally referred to as a subscriber loop.

The impedance of the subscriber line 20 is herein denoted as $Z_{LOOP}$, and impedance seen by an incoming signal from the subscriber line 20 is hereinafter referred to as $Z_{IN}$. The value of $Z_{LOOP}$, which is determined by individual telephone authorities in various countries, may be in the range of 600–900 ohms for the POTS band and in the range of 100–135 ohms for the xDSL band. The SLIC 30 is adapted to be coupled to first and second resistors 217, 219, which are utilized to define the input impedance.

The line card 10, which may be capable of supporting a plurality of subscribers lines 20, performs, among other things, two fundamental functions: DC loop supervision and DC feed. The purpose of DC feed is to supply enough power to the telephone device 12 at the customer end. The purpose of DC loop supervision is to detect changes in DC load, such as on-hook events, off-hook events and rotary dialing, or any other event that causes the DC load to change. In the interest of clarity and to avoid obscuring the invention, only that portion of the line card 10 that is helpful to an understanding of the invention is illustrated.

The voltage-feed SLIC 30 is a high voltage bipolar SLIC that drives voltages to the subscriber line 20 and senses current flow in the subscriber line 20. The SLIC 30 includes first and second differential line drivers 230, 235 that interface with the subscriber line 20 via tip and ring terminals 237, 239. The tip terminal 237 is coupled to a first terminal of a first sensing resistor ($R_{ab}$) 240 and to an inverting terminal of the first line driver 230. A second terminal of the first sensing resistor 240 is coupled to an output terminal of the first line driver 230. The ring terminal 239 is coupled to a first terminal of a second sensing resistor ($R_{bd}$) 242 and to an inverting terminal of the second line driver 235. A second terminal of the second sensing resistor 242 is coupled to an output terminal of the second line driver 235.

The line card 10 is adapted to provide external ringing. FIG. 2 illustrates a first switch 244 and second switch 245 for toggling between internal ringing and external ringing. During external ringing, the first and second switches 244, 245 are in position 2, and during normal operation or internal ringing, the switches 244, 245 are in position 1. When in position 2, the first switch 244 is coupled to a first terminal of a resistor 246, which has a second terminal coupled to a ground node 247. The second switch in position 2 is coupled to a first terminal of a resistor 248, which has a second terminal coupled to a first terminal of an external ringing generator 249. A second terminal of the external ringing generator 249 is coupled to the ground node 247. For internal ringing, the switches 244, 245 are in position 1, and the line card 10 internally generates a ringing signal and provides it to the subscriber loop 20.

The SLIC 30 includes a sum block 250 and a current-sensing circuit 260. The sum block 250 includes a first output terminal coupled to a non-inverting terminal of the first line driver 230, and a second (inverted) output terminal coupled to a non-inverting terminal of the second line driver 235. The sum block 250 is capable of receiving a DC feed signal (as well as ringing signals) from a DCIN terminal 265, a voice signal, a metering signal, and a data signal and is capable of adding one or more of the received signals and providing it to the first and second line drivers 230, 235. The signals into the SUM block 250 may be subjected to different levels of gain for optimal performance. The signal from the DCIN terminal 265 is low-pass filtered.

The current-sensing circuit 260 produces a current proportional to the current through the current sensing resistors 240, 242, subtracts a current proportional to a current from a cancellation terminal (CANC) 270, and provides the resulting (metallic) current to an IMT terminal 275 of the SLIC 30. Although not so limited, in the instant embodiment, the constant of proportionality for the current from the cancellation terminal (CANC) 270 is unity, and the constant of proportionality for the metallic line current is 0.001. Those skilled in the art will appreciate that only those portions of the SLIC 30 deemed relevant to the invention are disclosed herein. The SLIC 30 may employ other circuitry that is not illustrated in FIG. 2.

The SLIC 30 includes a longitudinal sensing circuit 276 that provides a current proportional to the current through the current sensing resistors 240, 242. Specifically, the longitudinal sensing circuit 276 adds the current flowing through the current sensing resistors 240, 242, divides the sum by two, and provides the resulting longitudinal current to an ILG terminal 277 of the SLIC 30. Although not so limited, in the instant embodiment, the constant of proportionality for the longitudinal line current is 0.001.

The SLIC 30 includes a first impedance matching loop 278 that adjusts a nominal value of the input impedance ($Z_{IN}$) to substantially match the impedance of the subscriber line 20. The first impedance matching loop 278 includes a nominal Z block 279 that receives the output signal of the current sensing circuit and provides a selected amount of "fixed" gain and delay to adjust a nominal value of the input impedance, $Z_{IN}$. In the illustrated embodiment, the nominal Z block 279 sets the nominal value of the input impedance to a fixed value of 900 ohms, which includes the resistance provided by resistors 217, 219, 240 and 242.

The SLIC 30 is connected to the SLAC 215 as well as to an external resistor 280, as well as a capacitor 281. In the illustrated embodiment, the resistor 280 is 100,000 ohms. A first terminal of the resistor 280 is coupled to the IMT terminal 275 of the SLIC 30, as well as to the VIN terminal 285 of the SLAC 215. A second terminal of the resistor 280 is coupled to a reference voltage node 282, as well as to a terminal of the capacitor 281. In one embodiment, the reference voltage 282 is in the range of about 1.4 volts. The external resistor 280 and the capacitor 281 form a single-pole low pass filter 283 that is capable of filtering at least a portion, if not all, of the signals above the voice band, such as data signals and metering signal. The external resistor 280 and the capacitor 281 convert the current flowing from the IMT terminal 275 to a proportional voltage signal for the SLAC 215. Although not necessary, the resistor 280 is external in the illustrated embodiment because in some embodiments it may be useful for the drive value of the resistor to be relatively precise and because each line card 10 may require different values.

The ILG terminal 277 of the SLIC 30 is connected to a VLG terminal 284 of the SLAC 215 as well as to a filter 286. The impedance of the filter 286 converts the current flowing from the ILG terminal 277 to a proportional voltage signal for the SLAC 215. The filter 286 removes undesirable frequencies such as those above the voice band.

A discrete network 288 couples the SLIC 30 to the SLAC 215 via the CANC terminals 270, 290. The discrete network 288 includes a first and second resistor 292, 294 and a capacitor 296. A first terminal of the first resistor 292 is coupled to the CANC terminal 270 of the SLIC 30 and a second terminal of the first resistor 292 is coupled to a first terminal of the second resistor 294. The second terminal of the second resistor 294 is coupled to the CANC terminal 290 of the SLAC 215. The capacitor 296 is coupled between the second terminal of the first resistor 292 and the reference voltage node 296. The discrete network 288 acts as a low pass filter and converts the voltage output signal from the SLAC 215 to a current and provides it to the SLIC 30.

The SLAC 215 interfaces with the telephonic device 12 through the SLIC 30 and over the subscriber line 20. The SLAC 215 includes two feedback loops: a DC cancellation loop 298 and a DC feed loop 300. In the illustrated embodiment, the two loops 298, 300 are implemented within a digital signal processor (DSP). Only those portions of the SLAC 215 deemed relevant to the instant invention are described herein, albeit the SLAC 215 may perform a variety of other functions that are not illustrated in FIG. 2.

The DC cancellation loop 298 includes an analog-to-digital converter 305, DC cancellation logic 315, a current limiter 317, and a digital-to-analog converter 318, and a switch 319. The switch 319, during a non-ringing mode, allows an output signal of the digital-to-analog converter 318 to pass to the CANC 215 terminal 290 of the SLAC. In contrast, during a ringing mode, and as is described in more detail below, the switch 319 couples the VIN and CANC terminals 285, 290 of the SLAC 215, thereby disengaging the DC cancellation loop 298 from the CANC terminal 290.

In the illustrated embodiment, to reduce hardwire complexity, the voice and DC components of the input signal from the VIN terminal 285 share the same analog-to-digital converter 305. The analog-to-digital converter 305 and digital-to-analog converter 318 include a decimator and interpolator, respectively. The analog-to-digital converter 305 in the illustrated embodiment is capable of providing two output signals, the first output signal is sampled at a 4 KHz frequency and provided as a digital signal to the DC cancellation logic 315, as well as to a switch hook detection logic 320. The second output signal of the analog-to-digital converter 305, comprising of voice and/or data (residual) components, is sampled at 32 KHz and provided to a CODEC (not shown). A residual data component may exist at the output of the analog-to-digital converter 305 since the single-pole low pass filter 283 may not remove the entire data signal.

During the non-ringing mode, the DC cancellation logic 315 receives the digital signal from the analog-to-digital converter 305, filters high frequencies, and provides substantially a DC signal. The DC signal is provided as an input to the DC feed logic 321, as well as to the current limiter 317. The output of the current limiter 317 is converted to an analog signal and then provided back to the SLIC 30 via the CANC terminal 270. The output of the current limiter 317 is also provided to the switch hook detection logic 320 for switch hook detection. The current provided to the CANC terminal 270 of the SLIC 30 is used to cancel the DC component of the signal from the current sense circuit 260. Thus, during a "stable" state (i.e., no transients present), the signal at the VIN terminal 285 of the SLAC 215 is essentially DC free.

The DC feed loop 300, in addition to the analog-to-digital converter 305 and DC cancellation logic 315, includes DC feed logic 321, a switch 322, and a digital-to-analog converter 325. In the illustrated embodiment, the digital-to-analog converter 325 may also interpolate. During the non-ringing state, the switch 322 provides an output signal from the DC feed logic 321 to the digital-to-analog converter 325. However, as will be described in more detail below, during the ringing state, the switch 322 disengages the output of the DC feed logic 321, and, instead, provides a ringing signal generated by a ring generator 323 to the digital-to-analog converter 325. The output from the digital-to-analog converter 325 is provided to a DCIN terminal 265 of the SLIC 30 via VHL terminal 326 of the SLAC 215. The DC feed logic 321 is capable of providing high DC voltage to the subscriber loop so that sufficient current (20–60 mA) can be driven through a resistance as high as 2K ohms.

When the DC conditions on the subscriber loop change suddenly, the DC feed logic 321 adapts to the change, thereby allowing normal transmission to continue. Examples of sudden changes in DC conditions include on-hook, off-hook, rotary dialing, and tone signaling. When the telephonic device 12 goes off-hook, the loop impedance drops almost instantly to a value below 2K ohms. In short subscriber loops, the loop impedance may be less than 200 ohms. For the line card 10 to function and transmit information properly, the DC conditions on the subscriber loop should be stabilized quickly, and in some cases, within milliseconds.

Figure 3:
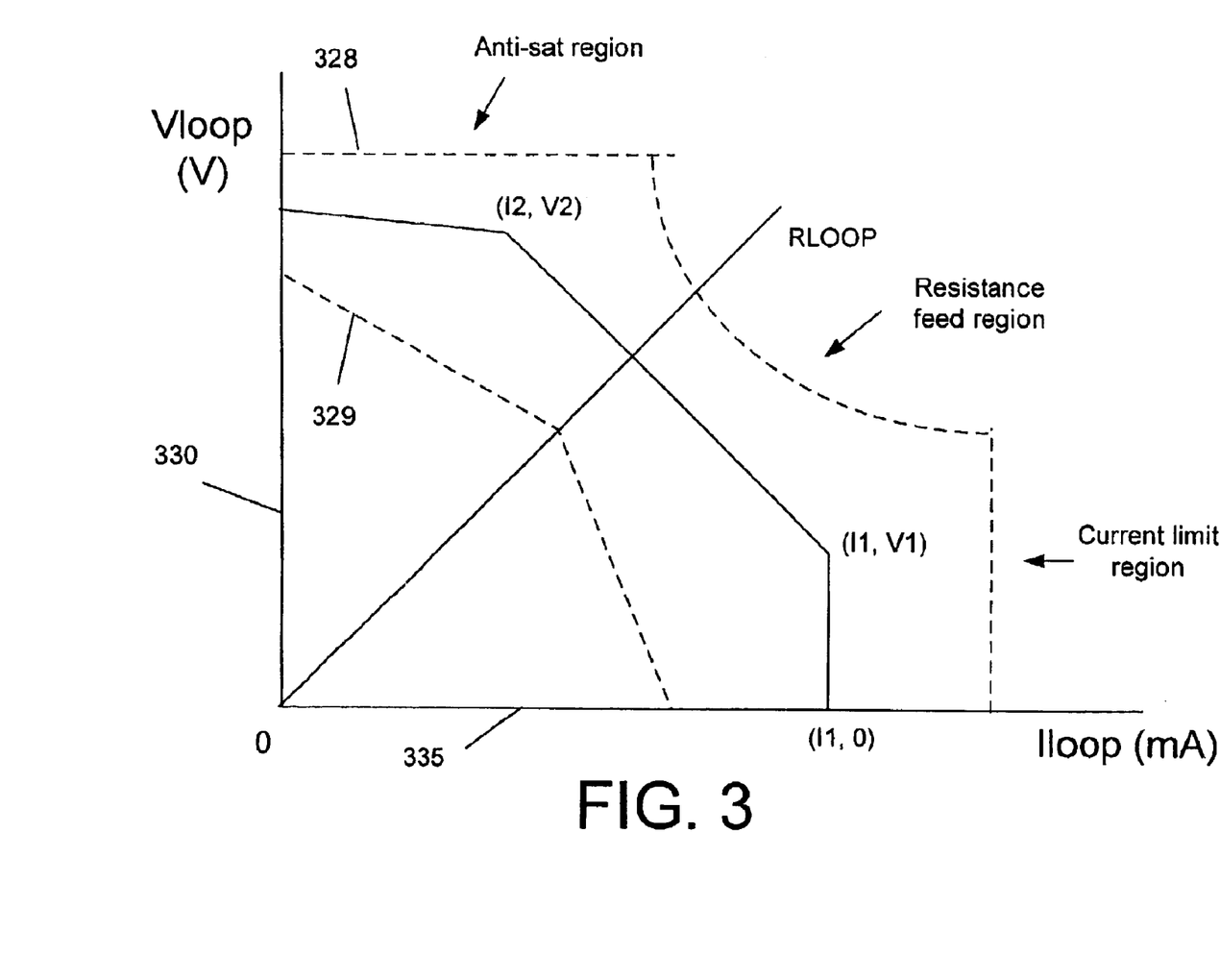
FIG. 3 depicts an exemplary DC feed curve that may be employed by the line card of FIG. 2.

FIG. 3 illustrates an exemplary DC feed curve that may be adapted for use by the DC feed logic 321. A dashed line 328 provides the upper limits for the electrical power, and a dashed line 329 provides the lower limits for the electrical power provided to the subscriber loop. A Y-axis 330 represents voltage, and an X-axis 335 represents current. As can be seen in FIG. 3, although not so limited, the DC feed curve includes an anti-saturation region, a resistance feed region, and a current limit region.

Referring again to FIG. 2, when the line card 10 is in a "stable" state (i.e., no transients), the signal at the VIN terminal 285 of the SLAC 215 comprises primarily a voice signal, although it may include residual metering and data signals that are not removed by the single-pole low pass filter 283. This single-pole low pass filter 283 provides an adequate performance by attenuating the data and metering signals to acceptable levels. Aside from being more cost effective than higher order low-pass filters, the single-pole low pass filter 283 also provides an added advantage in that it does not make the line card 10 unstable.

Figure 4:
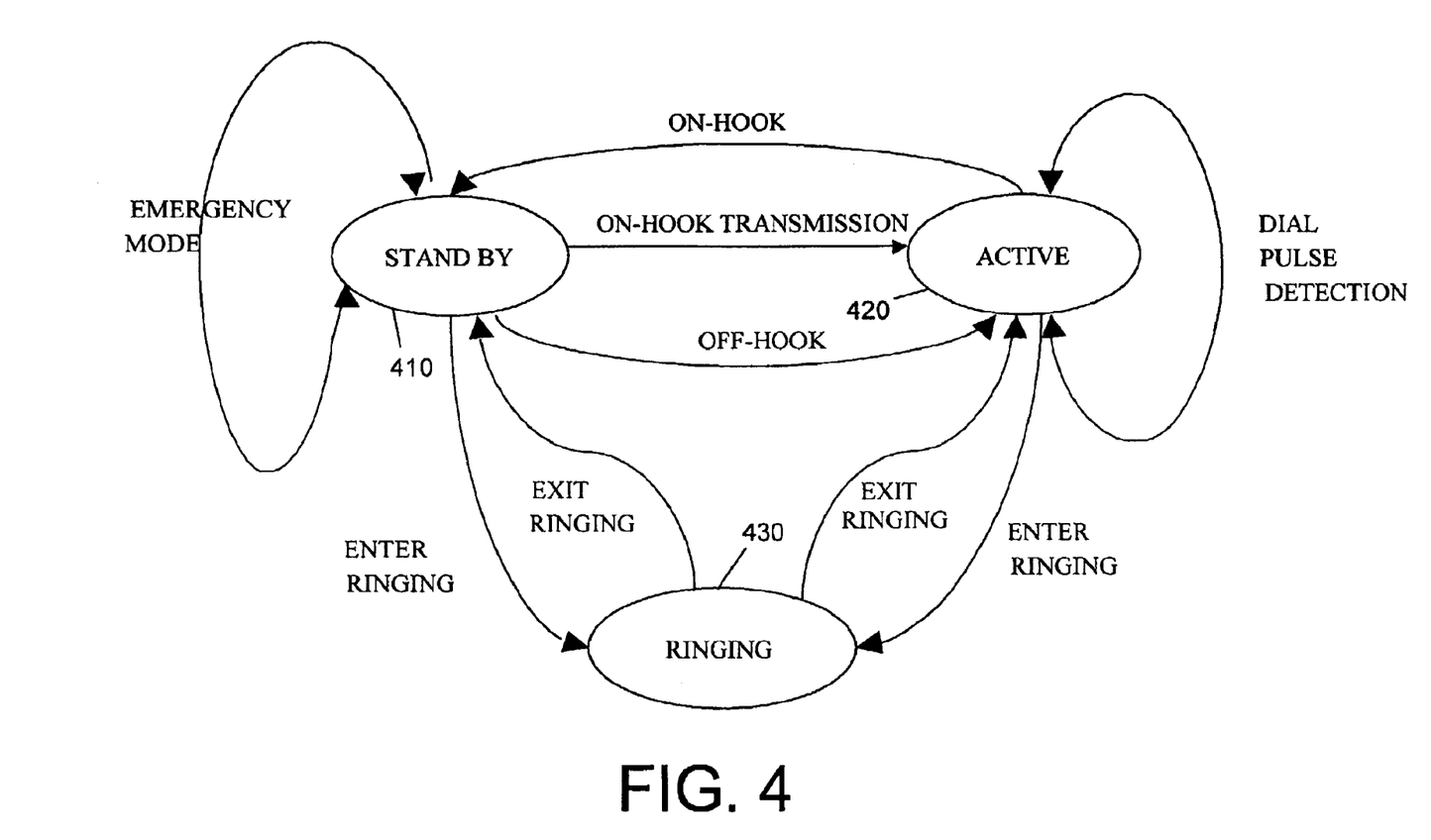
FIG. 4 illustrates a state diagram of the line card of FIG. 2 in accordance with the present invention.

The SLIC 30 of the line card 10 operates in at least three operating states, a standby state 410, an active state 420, and a ringing state 430, as shown in FIG. 4. The standby state 410 is a low power mode that monitors the loop current during which voice transmission is disabled and the upstream data path is turned off. The SLIC 30 switches from the standby state 410 to the active state 420, for example, when the telephonic device 12 goes off-hook. During the active state 420, the line card 10 may perform dial pulse detection. The SLIC reverts to the standby state 410 in response to the telephonic device 12 going on-hook.

The SLIC 30 may switch from the standby state 410 to the ringing state 430 in response to a ringing signal from a digital interface 350 (see FIG. 2). The digital interface 350, which includes a processor (not shown), controls the operation mode of the line card. For example, when a remote user places a call to the telephonic device 12, the central office instructs the digital interface 350 to ring the telephonic device 12. Accordingly, in response to the request from the central office, the digital interface provides a ring control signal to switches 319, 322 and the ring generator 323 through logic 352. The SLIC 30 may enter the ringing mode from either the standby state 410 or active state 420. Conversely, the SLIC 30 may exit the ringing state 430 and enter either the standby state 410 or the active state 420.

During the ringing mode, the switch 319 couples the VIN and CANC terminals 285, 290 of the SLAC 215, and the switch 322 couples the ring generator 323 to the digital-to-analog converter 325, which then converts the ringing signal into a digital signal before it is provided to the subscriber loop 30. In contrast, during the active state 420, when no ringing control signal is provided, the switches 319, 322 connect the respective DC cancellation and DC feed loops 298, 300 to the respective CANC and VHL terminals 290, 326 of the SLAC 215.

In response to receiving the ringing control signal, the ring generator 323 of the line card provides an internal ringing signal to the subscriber loop 20. Thus, the first and second switches 244, 245 are set to position 1. In response to the ringing control signal from the digital interface 350, the switch 319 couples the VIN terminal 285 to the CANC terminal 290 of the SLAC 215, thereby shielding the DC cancellation loop 298 from high voltages and currents commonly associated with ringing signals. Typically, for voice and data operation, the voltage at the VIN terminal 285 may reach a maximum of 50 volts DC when no current is flowing, which is a voltage level that may be handled by the DC cancellation loop 298. In contrast, a ringing signal, which commonly comprises a 20 Hz signal along with a DC offset, may be a peak (AC) 100 volts plus 20–30 volts DC signal, a voltage level that is too high for the DC cancellation loop 298. Accordingly, connecting the VIN and CANC terminals 285, 290 of the SLAC 215 aids in lowering the current level to the DC cancellation loop 298.

The impedance provided by the discrete network 288 at the CANC terminal 290 of the SLAC 215 is relatively low, approximately 16 to 17 K ohms. So, when the VIN and CANC terminals 285, 290 are shorted, the relatively low impedance of the discrete network 288 lowers the impedance seen at the VIN terminal 285, which is set primarily by the 100,000-ohm resistor 280. This is because adding a high and low impedance in parallel has a net effect of lowering the impedance. As a result of lower impedance, the voltage level present at the VIN terminal 285 during the ringing mode is generally at a lower level. Furthermore, the current sensing circuit 260 of the SLIC 30 aids in further reducing the voltage level at the VIN terminal 285, perhaps by half. This is because the current flowing from the VIN terminal 285 to the CANC terminal 290 is subtracted from the sensed line current in the SLIC 30 by the current sensing circuit 260. By lowering the impedance during the ringing mode, the line card 10 is able to handle currents of higher level, typically up to 130 mA.

In essence, shorting the VIN and CANC terminals 285, 290 allows the line card 10 to toggle between a low current configuration to a high current configuration. Without the VIN and CANC terminals 285, 290 shorted, the line card 100 can support a current of approximately 61 mA, whereas with the terminals 285, 290 shorted, the line card 10 can handle a current of approximately 130 mA, which is adequate for ringing.

The configuration of the line card 10 generally changes depending on the operating state of the line card 10. For example, in the standby state 410, a high-resolution current mode, the DC cancellation and DC feed loops 298, 300 are disabled, and the CANC terminal 290 supplies the voltage of the Vref node 282. During the standby state 410, the line card 10 delivers a low level of DC current to the subscriber loop 20, therefore high resolution of current is needed. The SLIC applies a 50 volt tip-ring voltage on the subscriber line in open loop. Assuming that the loop load is at least 10 Kohms, then approximately 3.3 mA (50 V/(10 KOhms+5 Kohms of internal SLIC 30 resistance)) current flows from the subscriber loop 20 in the standby state 410. The 3.3 mA in the standby state 410 is equivalent to the ⅓ of the full value of the voltage at the VIN terminal 285 in the standby state 410.

However, when the SLIC 30 changes states, from the standby state 410 to the ringing state 430, for example, the ⅓ of the voltage at the VIN terminal 285 corresponds to a 43 mA (as opposed to 3.3 mA in the standby state 410) of residual current in the ringing state 430. Thus, when the SLIC 30 switches states, the initial condition of the new SLIC state is generally incorrect, thereby causing transient behavior in the line card 10. Such transient behavior may affect with the normal operation of the line card 10, such as cause false switch hook detection. Transients may also occur during a transition from the active state 420 to the ringing state 430. Additionally, transients may also occur when the SLIC 30 transitions from the ringing state 430 to either the standby or active states 410, 420.

Figure 5:
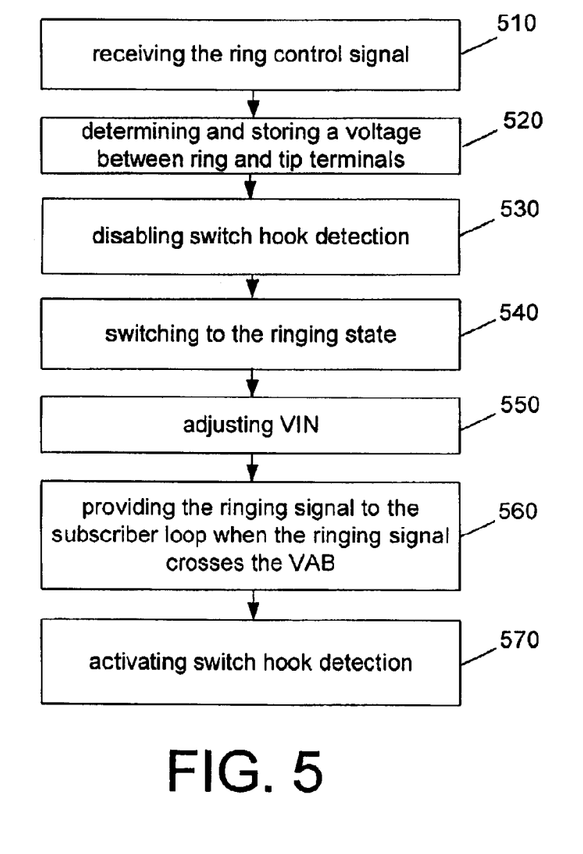
FIG. 5 illustrates an embodiment of a method in accordance with the present invention that may be implemented by the line card of FIG. 2.

Referring now to FIG. 5, a method in accordance with the present invention is illustrated to reduce the undesirable effects of the transients when entering the ringing state 430. The method of FIG. 5 begins at block 510, where the logic 352 receives the ring control signal from the digital interface 350. At block 520, the logic 352 determines and stores the voltage between the tip and ring terminals 237, 239 in response to receiving the ring control signal. In another embodiment, additional parameters, such as adaptive echo cancellation parameters or filter coefficients, may also be stored and later retrieved. At block 520, the logic 352 disables the switch hook detection logic 320 to avoid false switch-hook detection due to transient response. At block 540, the logic 352 switches to the ringing state (i.e. high-current mode), where switch 319 couples the VIN terminal 285 to the CANC terminal 290 of the SLAC 215.

At block 550, the logic 352 adjusts the voltage at the VIN terminal 285 to account for the different current scale in the ringing state 430, as compared to the current scale in the standby and active states 410, 420. If the line card 10, for example, switches from the standby state 410 to the ringing state 430, then the logic 352 adjusts the voltage at the VIN terminal 285 by a ratio of approximately 10/131, since the full current value during the standby state 410 is approximately 10 mA and the full current value during the ringing state 430 is 131 mA. Thus, by adjusting the voltage at the VIN terminal 285, the logic 352 is able to expeditiously achieve the proper voltage at the VIN terminal 285 for the ringing state 430. If the line card 10, for example, transitions from the active state 420 to the ringing state 430, the ratio for adjusting the voltage at the VIN terminal 285 is less relevant since the voltage VIN terminal 285 is zero during the active state 420. In an alternative embodiment, instead of adjusting the voltage at the VIN terminal 285, the logic 352 may wait a predetermined amount of time (e.g., 20 ms) to allow the transients to pass.

At block 560, the logic 352 allows (for internal ringing) the ring generator 323 to provide the ringing signal to the subscriber loop 20. For external ringing, the ring generator 249 applies the ringing signal to the subscriber loop 20. In one embodiment, the logic 352 allows the ringing signal to reach the subscriber loop 20 when the ringing signal reaches the stored ring-tip voltage at the block 420. The ringing signal is applied to the subscriber loop 20 when it crosses the stored ring-trip voltage to reduce any sudden voltage jumps at the tip-ring terminals 237, 239. At block 570, the logic 352 activates the switch hook detection logic.

Figure 6:
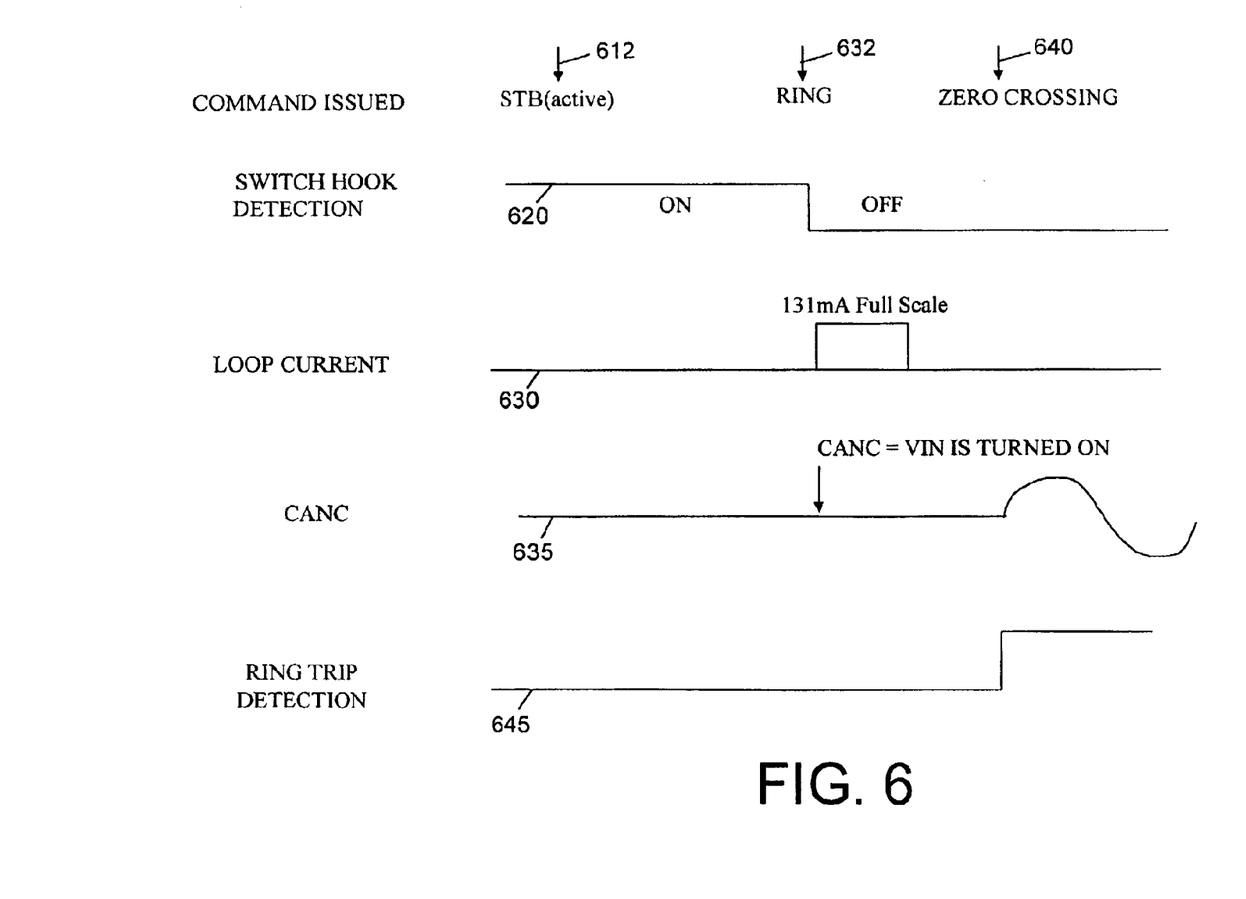
FIG. 6 depicts an exemplary timing diagram of the line card entering a ringing state of the line card of FIG. 2.

Referring now to FIG. 6, an exemplary timing diagram of a transition from standby or active states 410, 420 to the ringing state 430 in the line card 10 is illustrated. FIG. 6 illustrates that, at time 612, the line card 10 is in either standby or active state 410, 420. Accordingly, at the time 612, the switch hook detection logic 320 is operational, as shown by line 620. A line 630 illustrates that, at the time 612, the full scale current loop value is approximately 10 mA in the standby state 410, and approximately 62 mA during the active state 420.

At time 632, the ring control signal from the digital interface 350 is received. Accordingly, transitioning from the standby/active states 410, 420 to the ringing state 430 results in a transient, as shown on the line 630. In one embodiment, the logic 352 waits a predetermined amount of time (e.g., 20 ms) to allow the transient to pass. Alternatively, the logic 352 adjusts the voltage at the VIN terminal 285 to account for the different current scales during different operational states 410, 420, 430. A line 635 illustrates the output of the CANC terminal 290 of the SLAC 215. The ringing signal is turned on, and the ringing signal is applied to the subscriber loop 20 at time 640, where the ringing signal crosses the voltage at the tip and ring terminals 237, 239. At the time 640, the line 635 illustrates the output signal of the CANC terminal 290. A line 645 illustrates that at the time 640, the ring trip detection of the line card 10 is enabled.

Figure 7:
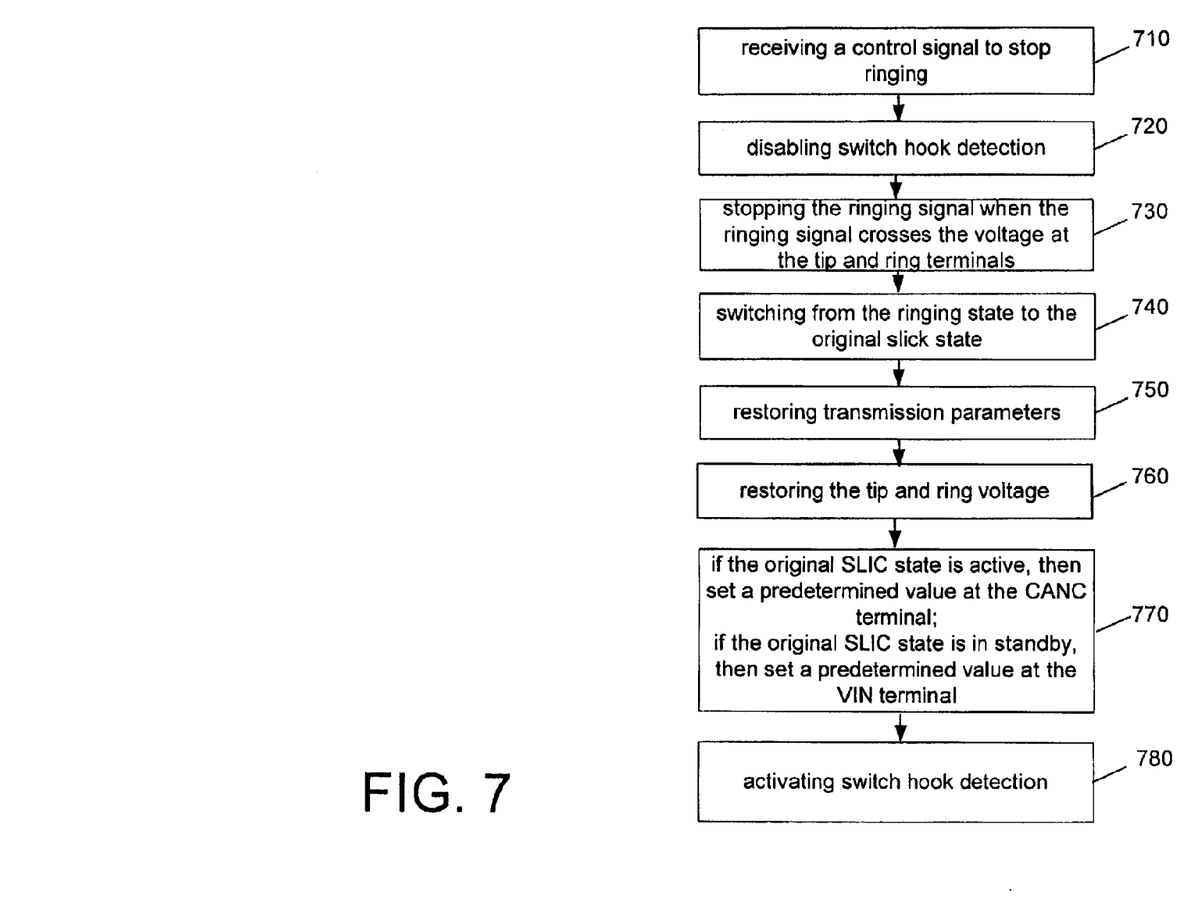
FIG. 7 illustrates an embodiment of a method in accordance with the present invention that may be implemented by the line card of FIG. 2.

Referring now to FIG. 7, a method in accordance with the present invention is illustrated to reduce the undesirable effects of the transients when exiting the ringing state 430 and entering the active state 420, assuming no ring trip detection occurs while the line card 10 was in the ringing state 430. The method of FIG. 7 begins at block 710, where the logic 352 receives the control signal from the digital interface 350 to stop ringing. At block 720, the logic 352 disables the switch hook detection to prevent false switch hook detection during the transition. At block 730, the logic 352 stops the ringing signal when the ringing signal reaches the voltage at the tip and ring terminals 237, 239 in response to receiving the control signal to stop ringing. At block 740, the logic 352 switches from the ringing state 430, where switch 319 no longer shorts the VIN terminal 285 to the CANC terminal 290 of the SLAC 215.

At block 750, the logic 352 restores the voice transmission parameters, and at block 760 the logic 352 restores the voltage between the ring and trip terminals 237, 239. These voice transmission parameters and the tip-ring voltage are the same as those stored in block 520 of FIG. 5, as previously described. If the line card switches back to active stage, then the voltage at the VIN terminal 285 will be zero, and the voltage at the CANC terminal 290 determines the loop current. If the line card switches back to the standby state, then the voltage at the CANC terminal 290 will be set to zero, and the voltage at the VIN terminal 285 determines the loop current. During the ringing state, the CANC terminal 290 is connected to the VIN terminal 285, which is equal to the ringing signal. When the line card switches back to its original state, which is in either the standby or active state, the initial voltage at the CANC terminal 290 and the VIN terminal 285 may not be correct for the new line state.

Therefore, if the line card goes back to the active stage, at block 770, the logic 352 sets a predetermined value at the CANC terminal 290 of the SLAC 215, to force the loop current to be smaller than the switch-hook threshold. Based on the current line card design, the full scale value at the CANC terminal 290 (1.02V) will output a 61.8 mA of loop current. The switch hook threshold in the active stage is 8.2 mA. Thus, the voltage at the CANC terminal 290 should be set to be less than 8.2/61.8*1.02=135 mV to avoid a false switch-hook detection.

If the line card goes back to the standby stage, the logic 352 sets a predetermined voltage at the VIN terminal 285 to force the loop current to be less than the switch hook threshold. In the current line card, the full scale value at the VIN terminal 285 (1.02V) will output a 10 mA of loop current in the standby stage. The switch hook threshold in the standby stage is 4.2 mA. Thus, the voltage at VIN terminal should be set to less than 4.2/10*1.02=0.43V to avoid the false switch-hook detection.

In an alternative embodiment, the logic 352 waits a predetermined amount of time (20 ms, for example) to allow the transient to pass. At block 780, the logic 352 activates the switch hook detection logic 320.

Figure 8:
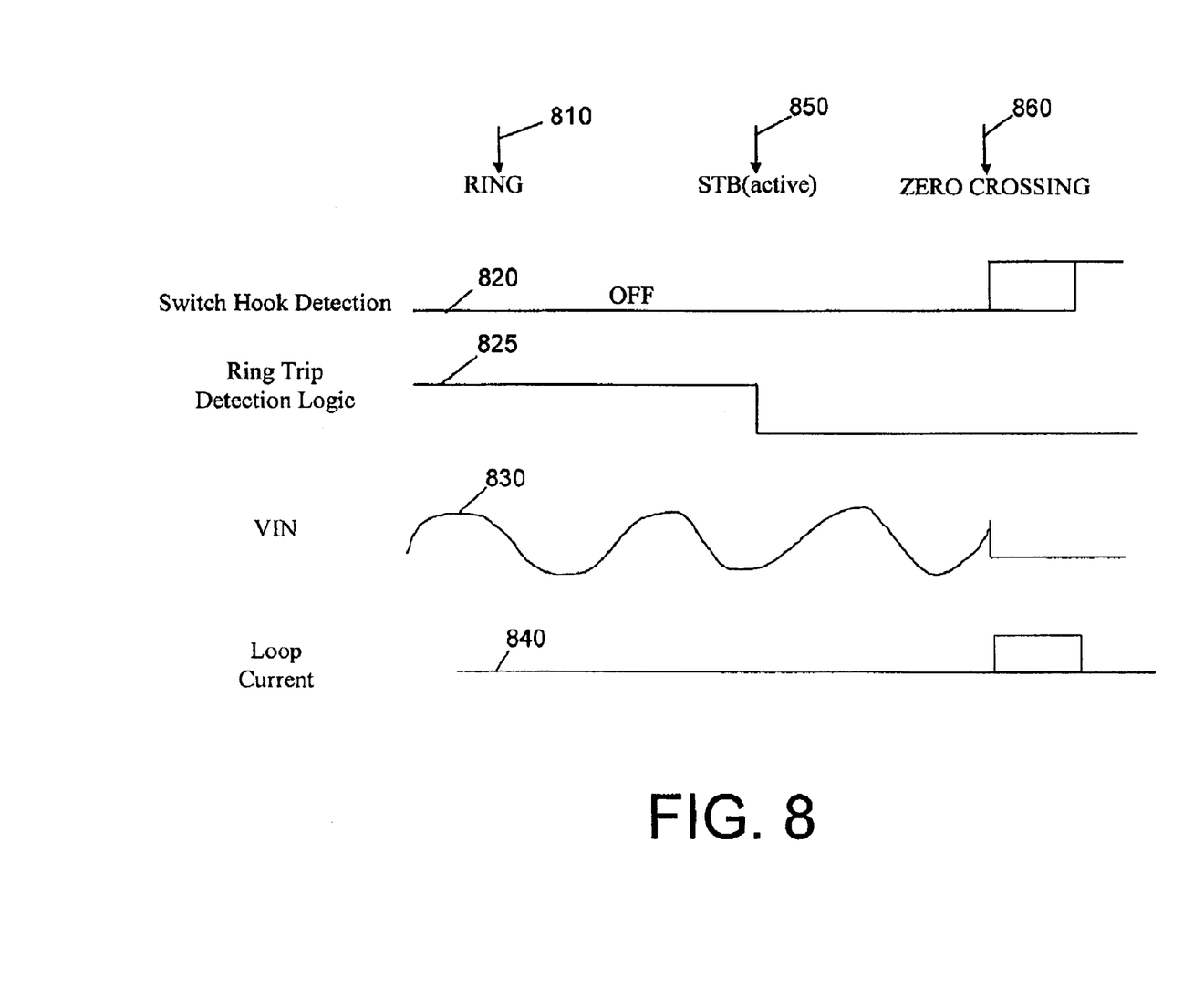
FIG. 8 depicts an exemplary timing diagram of the line card exiting the ringing state of the line card of FIG. 2 to the active or standby state of the line card.

FIG. 8 illustrates an exemplary timing diagram of the line card 10 transitioning from the ringing state 430 to the standby or active states 410, 420, in the absence of a ring trip detection. At time 810, the line card 10 is in the ringing state 430. Accordingly, the switch hook detection is disabled, as shown on line 820, and ring trip detection logic line 825 is active at the time 810. During the ringing state, at the time 810, the output of the VIN terminal 285 is illustrated on line 830, and the loop current is illustrated on line 840. In the ringing state 430, the loop current at the time 810 is approximately 131 mA.

At time 850, the line card 10 transitions to either the standby or active state 410, 420. Accordingly, the ring trip detection logic on the line 825 is off. At time 860, when the ringing signal on the line 830 reaches the voltage at the tip and ring terminals 237, 239, the ringing signal is turned off. At the time 860, the switch hook detection is activated, as shown on the line 820.

Referring again to FIG. 2, the SLAC 215 includes AC fault detection logic 355, ring-trip detection logic 360, and computation logic 365. The AC fault detection logic 355, ring-trip detection logic 360, and computation logic 365 are shown as functional blocks in FIG. 2 for illustrative purposes only. It should be appreciated that in actual implementation these blocks are implemented in software within the digital signal processor 50 (see FIG. 1).

The computation logic 365 receives a digital version of the signal from the VLG terminal of the SLAC, as well as the digital version of the signal from the VIN terminal 285. As is described in more detail below, the computation logic 365 computes a value based on the signal from the VIN terminal 285 that is later utilized by the ring-trip detection logic 360 for ring trip detection. Likewise, the computation logic 365 computes a value based on the digital signal received from the VLG terminal 284 that is utilized by the AC fault detection logic 355 for AC fault detection.

Figure 9:
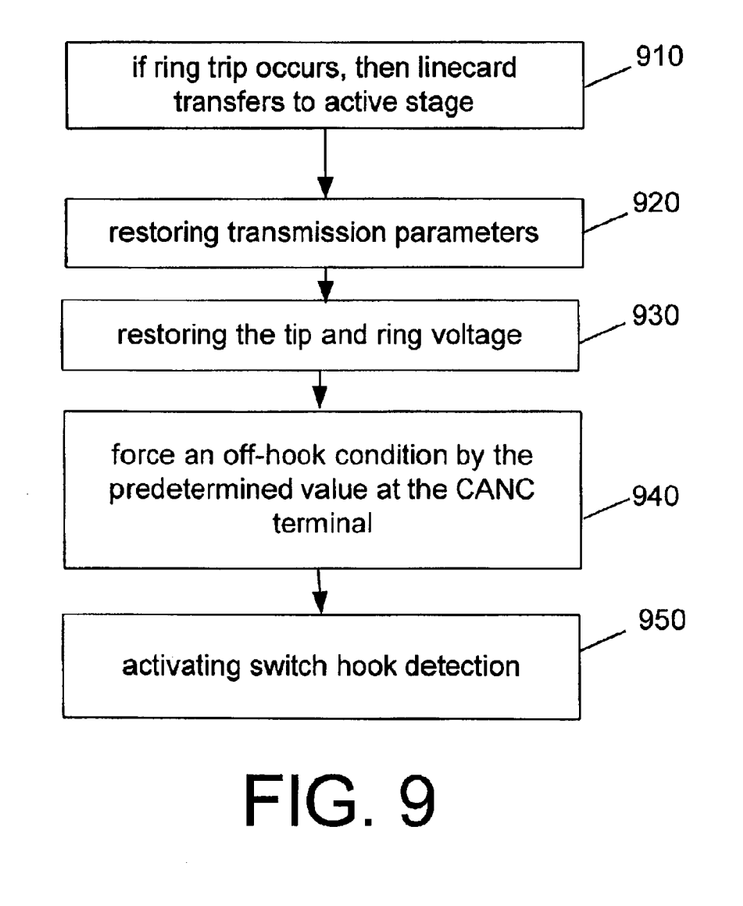
FIG. 9 illustrates another embodiment of a method in accordance with the present invention that may be implemented by the line card of FIG. 2.

Turning now to FIG. 9, a process is shown in accordance with another embodiment of the present invention. At block 910, if ring trip detection occurs while the line card 10 is in the ringing state, then the line card will only transfer to the active stage. At block 920, the logic 352 restores the voice transmission parameters, and at block 930 the logic 352 restores the voltage between the ring and trip terminals 237, 239. These voice transmission parameters and the tip-ring voltage are the same as those stored in block 520 of FIG. 5, as previously described. If the line card switches back to the active stage, then the voltage at the VIN terminal 285 will be zero, and the voltage at the CANC terminal 290 determines the loop current. The logic 352 sets the value of the CANC terminal 290 to a preselected value so that the loop current is larger than the switch hook threshold. At block 940, an off-hook condition is forced by the predetermined value at the CANC terminal 290. In one embodiment, the CANC terminal 290 voltage should be set to larger than 135 mA, as previously described. Alternatively, the logic 352 may wait a preselected amount of time, thereby allowing the transients to pass before activating the switch hook detection logic 320. An exemplary preselected time interval may be 20 ms. At block 950, the switch hook detection is then activated.

Figure 10:
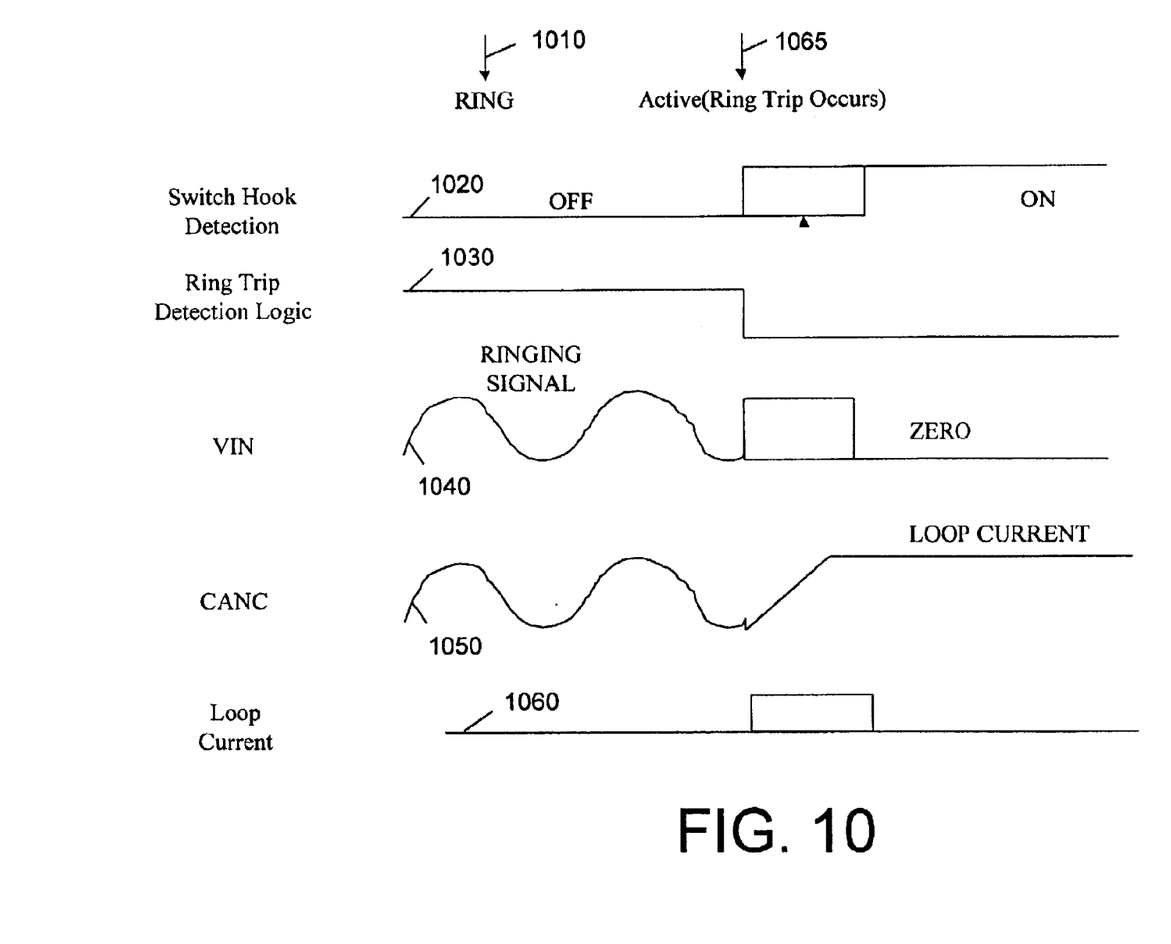
FIG. 10 depicts an exemplary timing diagram of the line card exiting the ringing state of the line card of FIG. 2 in response to a ring trip detection.

FIG. 10 illustrates an exemplary timing diagram of the line card 10 transitioning from the ringing state 430 to the active state 420, assuming a ring trip occurs during the ringing state. At time 1010, a ring control signal is received. Line 1020 illustrates that the switch hook detection is off during the time 1010, and line 1030 illustrates the status of the ring trip detection logic during the time 1010. Lines 1040 and 1050 illustrate the output of the VIN and CANC terminals 285, 290, respectively during the time 1010. Line 1060 illustrates the loop current during the ringing state at the time 1010.

At time 1065, a ring trip occurs, during which time a transient is present, as shown by the line 1060. At the time 1065, the logic 352 sets a loop current larger than the switch hook threshold, as indicated on the line 1050. The voltage at the VIN terminal 285 after the time 1065 becomes substantially zero. The switch hook detection is activated after the time 1065, as shown on the line 1020.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method to reduce false switch hook detection in a line card coupled to a subscriber loop via a ring and tip terminal, comprising:

operating in a first state of the line card;

receiving a control signal;

disabling switch hook detection in the line card;

storing a value representative of a voltage level between the ring and tip terminal in response to receiving the control signal;

determining an initial condition of a second state of the line card; and operating in the second state of the line card in response to receiving the control signal, wherein the second state begins to operate from the determined initial condition; and providing a ringing signal to the subscriber loop, wherein the ringing signal is provided in response to the ringing signal crossing the stored voltage value.

2. The method of claim 1, wherein receiving the control signal comprises receiving a ringing control signal.

3. The method of claim 2, wherein operating in the first state comprises operating in at least one of a standby state and an active state of the line card.

4. The method of claim 3, wherein determining the initial condition of the second state includes determining the initial condition of the ringing state of the line card.

5. The method of claim 4, wherein determining the initial condition of the second state comprises determining initial condition based on a ratio of a full scale current value in the first state and a full scale current value in the second state.

6. The method of claim 1, further activating the switch hook detection in the line card in response to providing the ringing signal.

7. The method of claim 1, wherein receiving the control signal comprises receiving a control signal to stop ringing providing that ring trip has not occurred.

8. The method of claim 7, wherein operating in the first state comprises operating in a ringing state of the line card.

9. The method of claim 8, wherein operating in the second state comprises operating in at least one of a standby state and an active state of the line card.

10. The method of claim 9, wherein determining an initial condition of the second state of the line card comprises setting the initial condition to a value less than a switch hook threshold.

11. The method of claim 10, wherein the second state begins to operate from the determined initial condition includes adjusting a current to the subscriber loop.

12. A method to reduce false switch hook detection in a line card coupled to a subscriber loop via a ring and tip terminal, comprising:
   operating in a first state of the line card;
   receiving a control signal, wherein receiving the control signal comprises receiving a ring trip detection signal to stop ringing;
   disabling switch hook detection in the line card;
   storing a value representative of a voltage level between the ring and tip terminal in response to receiving the control signal;
   determining an initial condition of a second state of the line card;
   operating in the second state of the line card in response to receiving the control signal, wherein the second state begins to operate from the determined initial condition;
   providing a ringing signal to the subscriber loop; and
   stopping the ringing signal in response to the ringing signal crossing the stored voltage value.

13. The method of claim 12, wherein operating in the first state of the line card further comprises operating in a ringing state of the line card and wherein operating in the second state of the line card further comprises operating in an active state of the line card.

14. The method of claim 12, wherein determining an initial condition of the second state of the line card further comprises setting the initial condition to a value larger than a switch hook threshold and wherein the second state begins to operate from the determined initial condition includes adjusting a current to the subscriber loop.

15. The method of claim 12, wherein the value is retrievably stored, and further storing at least one of adaptive echo parameter, cancellation parameter, and filter coefficient.

16. An apparatus to reduce false switch hook detection, the apparatus capable of operating in at least a first and a second state, comprising:
   switch hook detector; and
   a processor adapted to:
   receive a control signal;
   store a value representative of a voltage level between a ring and tip terminal in response to receiving the control signal;
   interrupt switch hook detection;
   determine an initial condition of the second state;
   operate in the second state in response to receiving the control signal, wherein the second state begins to operate from the determined initial condition; and
   provide a ringing signal to a subscriber loop in response to the ringing signal crossing the stored voltage value.

17. The apparatus of claim 16, wherein the processor adapted to receive a control signal comprises the processor adapted to receive a ringing control signal.

18. The apparatus of claim 17, wherein the processor adapted to operate in the first state comprises operating in at least one of a standby state and an active state.

19. The apparatus of claim 18, wherein the processor adapted to determine the initial condition of the second state includes the processor adapted to determine the initial condition of the ringing state.

20. The apparatus of claim 19, wherein the processor adapted to determine the initial condition of the second state comprises the processor adapted to determine the initial condition based on a ratio of a full scale current value in the first state and a full scale current value in the second state.

21. The apparatus of claim 16, wherein the processor is further adapted to activate the switch hook detection in the line card in response to providing the ringing signal.

22. The apparatus of claim 16, wherein the processor adapted to receive the control signal comprises the processor adapted to receive a control signal to stop ringing.

23. The apparatus of claim 16, wherein the processor is adapted to stop the ringing signal in response to the ringing signal crossing the stored voltage value.

24. The apparatus of claim 23, wherein the processor adapted to operate in the first state comprises the processor adapted to operate in a ringing state and wherein the processor adapted to operate in the second state comprises the processor adapted to operate in at least one of a standby state and an active state.

25. The apparatus of claim 24, wherein the processor adapted to determine the initial condition of the second state comprises setting the initial condition to a value less than a switch hook threshold.

26. The apparatus of claim 25, wherein the second state begins to operate from the determined initial condition includes adjusting a current to the subscriber loop.

27. A line card, comprising:
   a subscriber line interface circuit coupled to a subscriber loop via a ring and trip terminal; and
   a processor coupled to the subscriber line interface circuit, wherein the processor is adapted to:
   operate in a first state of the line card;
   receive a control signal;
   store a value representative of a voltage level between the ring and tip terminal in response to receiving the control signal;
   interrupt switch hook detection in the line card;
   determine an initial condition of a second operating state of the line card;
   operate in the second state of the line card in response to receiving the control signal, wherein the second state begins to operate from the determined initial condition; and
   provide a ringing signal to the subscriber loop in response to the ringing signal crossing the stored voltage value.

28. The line card of claim 27, wherein the subscriber line interface circuit is a voltage-feed subscriber line interface circuit.

29. The line card of claim 27, wherein the processor adapted to receive a control signal comprises the processor adapted to receive a ringing control signal.

30. The line card of claim 29, where the processor adapted to operate in the first state comprises operating in at least one of a standby state and an active state of the line card.

31. An apparatus to reduce false switch hook detection in a line card coupled to a subscriber loop, comprising:

- means for operating in a first state of the line card;
- means for receiving a control signal;
- means for disabling switch hook detection in the line card;
- means for storing a value representative of a voltage level between a ring and tip terminal in response to receiving the control signal;
- means for determining an initial condition of a second operating state of the line card;
- means for operating in the second state of the line card in response to receiving the control signal, wherein the second state begins to operate from the determined initial condition; and
- means for providing a ringing signal to the subscriber loop, wherein the ringing signal is provided in response to the ringing signal crossing the stored voltage value.

32. A method to reduce false switch hook detection in a line card coupled to a subscriber loop, comprising:

- operating in a first state of the line card;
- determining if a ring trip occurs;
- disabling switch hook detection in the line card in response to determining that the ring trip has occurred;
- determining an initial condition of a second state of the line card;
- operating in the second state of the line card in response to determining the ring trip, wherein the second state begins to operate from the determined initial condition; and
- providing a ringing signal to the subscriber loop, wherein the ringing signal is provided in response to the ringing signal crossing a stored voltage value.

* * * * *